United States Patent
Rajaram et al.

[11] Patent Number: 6,136,736
[45] Date of Patent: *Oct. 24, 2000

[54] DOPED SILICA GLASS

[75] Inventors: Mohan Rajaram; Curtis E. Scott, both of Mentor, Ohio

[73] Assignee: General Electric Company, Schenectady, N.Y.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/858,872

[22] Filed: May 19, 1997

Related U.S. Application Data

[63] Continuation-in-part of application No. 08/381,374, Jan. 31, 1995, which is a continuation of application No. 08/069,626, Jun. 1, 1993, abandoned, which is a continuation-in-part of application No. 08/437,843, May 9, 1995, Pat. No. 5,631,522.

[51] Int. Cl.$^7$ .................................................. C03C 13/04
[52] U.S. Cl. ............................. 501/54; 501/64; 501/154; 313/571; 313/636; 313/640
[58] Field of Search ........................ 501/54, 64; 313/571, 313/636, 640

[56] References Cited

U.S. PATENT DOCUMENTS

| | | |
|---|---|---|
| 2,080,262 | 5/1937 | Fuwa . |
| 2,805,166 | 9/1957 | Löffler . |
| 3,527,711 | 9/1970 | Barber et al. ............................. 501/54 |
| 3,726,695 | 4/1973 | Beall . |
| 3,764,286 | 10/1973 | Antczak . |
| 3,842,307 | 10/1974 | Dobrusskin et al. .................... 313/184 |
| 3,848,152 | 11/1974 | Schultz ...................................... 501/54 |
| 3,855,144 | 12/1974 | Barber et al. . |
| 3,912,959 | 10/1975 | Muta . |
| 3,935,117 | 1/1976 | Barber et al. .......................... 350/96.1 |
| 4,047,067 | 9/1977 | Clausen . |
| 4,115,134 | 9/1978 | Rhodes . |
| 4,127,416 | 11/1978 | Lumby . |
| 4,147,744 | 4/1979 | Rhodes . |
| 4,166,831 | 9/1979 | Rhodes . |

(List continued on next page.)

FOREIGN PATENT DOCUMENTS

| | | |
|---|---|---|
| 0 019 327 A1 | 11/1980 | European Pat. Off. . |
| 0 264 996 A1 | 4/1988 | European Pat. Off. . |
| 0 466 932 A1 | 8/1991 | European Pat. Off. . |
| 0 510 653 A1 | 4/1992 | European Pat. Off. . |
| 0 643 021 A1 | 3/1995 | European Pat. Off. . |
| 6219768 | 8/1994 | Japan . |
| 0346259 | 8/1972 | U.S.S.R. ................................ 501/54 |
| 0391074 | 7/1973 | U.S.S.R. ................................ 501/54 |
| 0441246 | 12/1974 | U.S.S.R. ................................ 501/54 |
| 0709573 | 1/1980 | U.S.S.R. ................................ 501/54 |
| 0923975 | 4/1982 | U.S.S.R. ................................ 501/54 |
| 1194818 | 6/1970 | United Kingdom . |

OTHER PUBLICATIONS

Design of Pulsed Alkali Vapor Lamps Utilizing Alumina, Yttria and Sapphire Envelopes Journal of IES/Jul., 1972.

The Electrical Properties of Vitreous Silica Journal of the Society of Glass Technology, Apr., 1959.

"Densification Inhibitor of Low Dielectric Binary Glass Composite" Jean et al. J Mater Sci (1996), 31(16) p 4289–95.

*Primary Examiner*—Paul Marcantoni
*Attorney, Agent, or Firm*—Fay, Sharpe, Fagan, Minnich & McKee, LLP

[57] ABSTRACT

A metal halide or mercury lamp including an arc tube comprised of a glass composition consisting essentially of at least 90 weight percent $SiO_2$ and including between about 10 and 1000 parts per million of a trivalent element slected from the group consisting of Pr, Nd, Pm, Sm, Gd, Tb, Dy, Ho, Er, Tm, Yb, Lu, Ac, Th, Pa, U, Np, Pu, Am, Cm, Bk, Cf, Es, Fm, Md, No, Lr, Unq, Unp, Ga, and mixtures thereof such that the viscosity of the glass composition is greater than $10^{14.5}$ poise at 1100° C.

13 Claims, 6 Drawing Sheets

U.S. PATENT DOCUMENTS

| | | |
|---|---|---|
| 4,182,972 | 1/1980 | Kaneno . |
| 4,256,988 | 3/1981 | Coaton . |
| 4,361,779 | 11/1982 | van der Steen . |
| 4,373,030 | 2/1983 | Kaneno . |
| 4,394,453 | 7/1983 | Dumbaugh, Jr. . |
| 4,492,898 | 1/1985 | Lapatovich . |
| 4,495,116 | 1/1985 | Kaneno . |
| 4,501,993 | 2/1985 | Mueller . |
| 4,731,348 | 3/1988 | Gonzales-Oliver . |
| 4,755,492 | 7/1988 | Greskovich . |
| 4,757,236 | 7/1988 | Dakin . |
| 4,761,390 | 8/1988 | Hartnett . |
| 4,769,353 | 9/1988 | Greskovich . |
| 4,783,615 | 11/1988 | Dakin . |
| 4,841,195 | 6/1989 | DeWith . |
| 4,861,737 | 8/1989 | Prud'Homme van Reine . |
| 4,972,120 | 11/1990 | Witting . |
| 5,023,506 | 6/1991 | Canale . |
| 5,032,762 | 7/1991 | Spacil . |
| 5,075,587 | 12/1991 | Pabst . |
| 5,083,059 | 1/1992 | Graham . |
| 5,138,228 | 8/1992 | Thomas et al. . |
| 5,187,412 | 2/1993 | El-Hamamsy et al. . |
| 5,196,759 | 3/1993 | Parham . |
| 5,236,876 | 8/1993 | Van Hal . |
| 5,258,691 | 11/1993 | Dakin . |
| 5,262,365 | 11/1993 | Oyobe et al. ............................ 501/55 |
| 5,270,615 | 12/1993 | Chang . |
| 5,464,462 | 11/1995 | Langer et al. ............................ 501/53 |
| 5,572,091 | 11/1996 | Langer et al. ............................ 501/64 |
| 5,589,734 | 12/1996 | Diesenhofer et al. .................. 313/636 |
| 5,631,522 | 5/1997 | Scott et al. ............................ 313/636 |
| 5,729,090 | 3/1998 | Scott et al. ............................ 313/637 |

DOPED SILICA GLASS

This application is a continuation-in-part of U.S. patent application Ser. No. 08/381,374 filed on Jan. 31, 1995 which is a continuation of U.S. Ser. No. 08/069,626 filed on Jun. 1, 1993 and a continuation-in-part of U.S. patent application Ser. No. 08/437,843 filed on May 9, 1995, now U.S. Pat. No. 5,631,522. The disclosures of each of these applications being herein incorporated by reference.

BACKGROUND OF THE INVENTION

This invention relates to a glass comprised primarily of silica. More particularly, this invention relates to a silica glass doped with constituents to provide high viscosity and resistance to diffusion of hydrogen and alkali ions therethrough. The glass of the invention is particularly well-suited to use in lamp and semiconductor applications. Throughout the specification, numerous references will be made to use of the glass in construction of lamp envelopes or in crucibles and tubes for semiconductor applications. However, it should be realized that the inventive glass is also suitable to most glass applications including window glass for high temperature and space environments.

This invention relates to a glass formed of natural or synthetic silica having very low levels of impurities yet including dopants that effectively improve viscosity characteristics and trap monovalent ions. This invention is particularly suited to the use of synthetic silica because of its low impurity levels.

Silica glass has been used in metal-halide, halogen and mercury lamps because of its excellent mechanical strengths and its ability to handle high operating temperatures. In addition, fused silica is becoming an important constituent of the ever-expanding semiconductor and fiber optics industries wherein high purity and resistance to high temperatures are requisite characteristics.

A particular requirement in the semiconductor industry is a desire for low levels of impurities. Accordingly, efforts are frequently made to reduce impurities to levels as low as possible. However, a difficulty often encountered in utilizing the low impurity synthetic silica is a tendency towards a low viscosity. Although a low viscosity may benefit fabricators who rework silica products, many fabricators require a fused silica having a higher viscosity. The semiconductor industry is an example of an industry which requires a high viscosity yet low impurity levels. The present invention has identified a plurality of dopants which improve viscosity characteristics without adding unacceptable contaminants to the glass composition.

In addition to the semiconductor industry, low impurity level, high viscosity silica will have great suitability in the manufacture of lamp envelopes. Particularly, metal halide arc discharge lamps in which the glass composition of this invention is beneficial when utilized to form the arc chamber, include, but are not limited to U.S. Pat. Nos. 4,047,067 and 4,918,352 (electrode), and 5,032,762 (electrodeless), the disclosures of which are herein incorporated by reference. Metal halide lamps of this type are generally comprised of an arc discharge chamber surrounded by a protective envelope. The arc chamber includes a fill of light emitting metals including sodium and rare earth elements such as scandium, indium, dysprosium, neodymium, praseodymium, cerium, and thorium in the form of a halide, optionally mercury, and optionally an inert gas such as krypton or argon. U.S. Pat. No. 4,798,895, herein incorporated by reference, describes a representative metal halide dose which when used in combination with an envelope comprised of sodium resistant glass of the present invention, creates a superior lamp.

It has been found that the life of metal halide lamps is frequently limited by the loss of the monovalent sodium ions, particularly from the metal halide fill during lamp operation via ion diffusion through the arc chamber. More particularly, fused quartz and synthetic silica are relatively porous to ion diffusion, and during lamp operation, energetic monovalent ions pass from the arc plasma through the chamber wall and condense in the region between the arc chamber and the outer jacket or envelope of the lamp. In the case of sodium, the lost sodium is then unavailable to the arc discharge and can no longer contribute its characteristic emissions, causing the light output to gradually diminish, and causing the color to shift from white towards blue. In addition, the arc becomes more constricted, and in a horizontally operated lamp, the arc may bow against and soften the arc chamber wall. Sodium loss may also cause the operating voltage of the lamp to increase to the point where the arc can no longer be sustained by the ballast and failure of the lamp may result.

In an attempt to reduce the effects of sodium diffusion through the arc chamber, the skilled artisan has historically relied on coating the arc chamber with sodium diffusion resistant materials. Attempts to solve diffusion problems have included depositing aluminum silicate and titanium silicate layers on the outside surfaces of the arc tube, as described in U.S. Pat. Nos. 4,047,067 and 4,017,163 respectively. Alternatively, U.S. Reissue Pat. No. 30,165 discloses applying a vitreous metal phosphate and arsenate coating on the inner surface of the arc tube. In contrast, U.S. Pat. No. 5,032,762 discloses beryllium oxide coatings.

While these methods have met with success in reducing sodium diffusion, the methods also require additional processing steps associated with applying a coating. Furthermore, the lamp's high temperature of operation, and frequently corrosive environment, may destroy the adherence between coating and arc chamber. Moreover, cracking and/or peeling can result, exposing the quartz to sodium ions and allowing sodium diffusion to occur. Accordingly, it would be desirable in the art to have a glass material which reduces sodium diffusion without the application of additional coatings.

SUMMARY OF THE INVENTION

Accordingly, it is a primary object of this invention to provide a new and improved glass for lighting and semiconductor applications.

It is a further advantage of this invention to provide a new and improved synthetic fused silica glass having a viscosity above $10^{14.5}$ poise at 1,100° C.

It is a primary object of this invention to provide a new and improved glass composition which is resistant to ion diffusion yet is easy to manufacture and exhibits viscosity which permits formation of tubes and lamp envelopes. It is a further advantage of this invention to provide a new and improved glass particularly suited to be used to form an arc discharge chamber of a sodium containing lamp. It is a still further advantage of this invention to provide a longer-lived, higher quality, sodium containing lamp.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

To achieve the foregoing objects in accordance with the purpose of the invention, as embodied and broadly described herein, the glass composition of the invention is comprised predominantly of silica and includes either yttrium, gallium, or trivalent element from the rare earth elements in the lanthanide or actinide series or mixtures thereof.

Preferably, the dopant is selected from the group consisting of yttrium, gallium, lanthanum, actinium, cerium, praseodymium, neodymium, promethium, samarium, europium, gadolinium, terbium, dysprosium, holmium, erbium, thulium, ytterbium, lutetium, thorium, protactinium, uranium, neptunium, plutonium, americium, curium, berkelium, californium, einsteinium, fermium, mendelevium, nobelium, lawrencium, uniliquadium, unnilpentium and mixtures thereof.

In a preferred form, the silica mixture is formed by combining at least 90, preferably 95, and more preferably 99 weight percent silica with the trivalent element(s).

Preferably, the silica glass contains between 10 and 1000 parts per million of at least one of said element(s). More preferably, between 20 and 1000 ppm of at least two of said elements. For example, the glass composition of the invention comprises quartz or synthetic silica, doped with between about 20 to about 1000 ppm by weight of at least one of the trivalent element(s).

As utilized throughout this application, the term "glass" includes both "quartz" and "synthetic silica". More particularly, the inventive glass is directed to a composition comprised of a majority of $SiO_2$, interchangeably referred to herein as "synthetic silica" and "quartz".

In a particularly preferred application, the glass composition is formed from a high purity synthetic silica or a high purity fused quartz comprised of less than about 0.1 ppm by weight sodium, more preferably less than about 0.01 ppm; less than about 0.1 ppm potassium or lithium, more preferably less than about 0.01 ppm; less than about 0.2 ppm iron, more preferably less than 0.01 ppm, and less than about 0.05 ppm chromium.

In a further preferred embodiment of the invention, the glass composition is utilized to form the arc discharge envelope of a lamp containing a fill including sodium.

BRIEF DESCRIPTION OF THE DRAWINGS

The invention consists in the novel parts, construction, arrangements, combinations, and improvements shown and described in the accompanying drawings which are incorporated in and constitute a part of the specification, illustrate embodiments of the invention and, together with the description, serve to explain the principle of the invention.

DESCRIPTION OF THE INVENTION

Reference will now be made in detail to the present preferred embodiment of the invention.

While the invention will be described in connection with a preferred embodiment, it will be understood that it is not intended to limit the invention to that particular embodiment. On the contrary, it is intended to cover all alternatives, modifications and equivalents as may be included within the spirit and scope of the invention defined by the appended claims. Viscosity as a function of $R=Al_2O_3/M_2O$, wherein M=Li, K and Na, has been found to have no relationship between the viscosity and the ratio (R) in fused synthetic silica. However, the current inventors have found that the log of viscosity is well represented by the function of $R=XO_3/(M_2O+H_2O)$ where $X_2O_3$ is a trivalent element.

Figure 1:
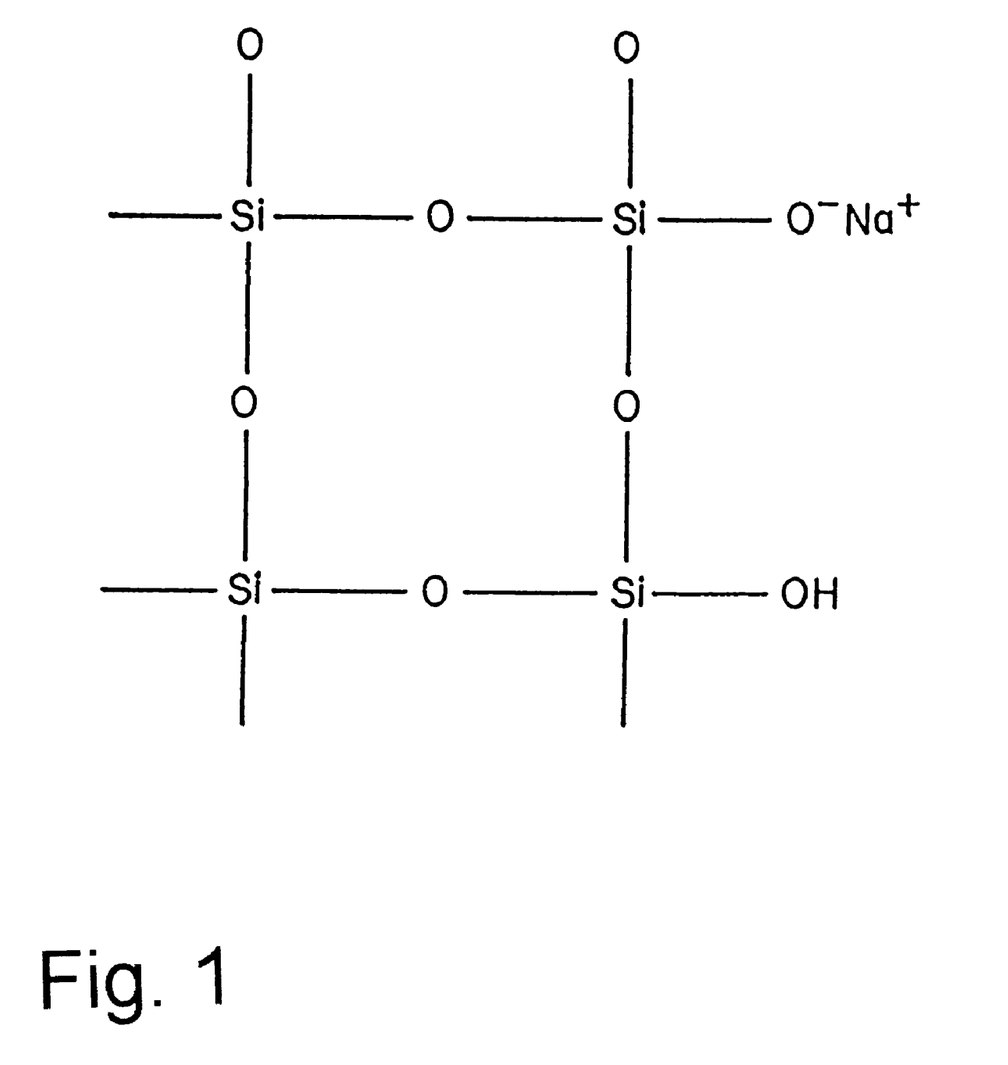
FIG. 1 is a schematic representation of the lattice structure of a glass composition.
Figure 2:
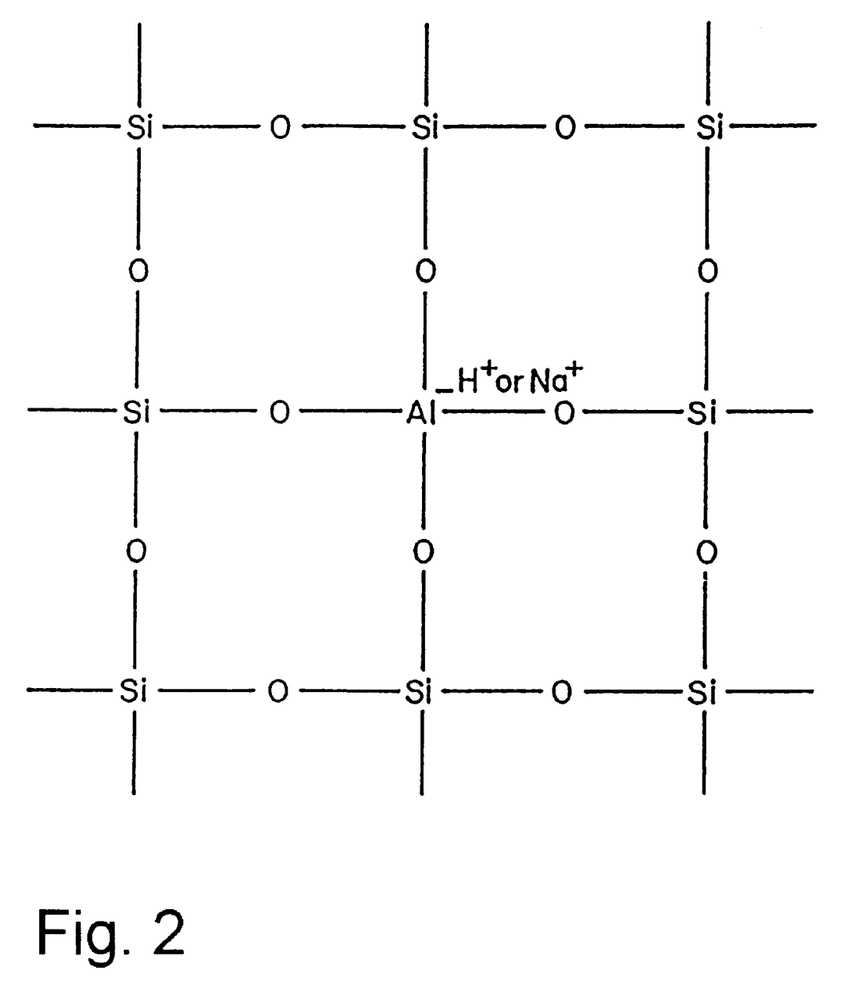
FIG. 2 is a schematic represention of the lattice structure of a glass composition in accord with the present invention.

Particularly, without being bound by theory, it is believed that both alkali and hydroxyl groups present as impurities in all synthetic silica compositions function to terminate the composition network by forming non-bridging oxygens as shown in FIG. 1. This indicates that the hydroxyl group is a substantial contributor to the R ratio. Concurrently, the inventors have determined that the addition of calculated amounts of aluminum, or the other trivalent elements as identified above, generally in the form of an oxide can create a site in the lattice structure functioning to tie up terminal alkali and hydroxyl groups, allowing the bridging of silica and oxygen to continue (see FIG. 2). The additional binding of silicon, alkali, and oxygen molecules results in a higher viscosity fused silica. In fact, it is noted that trivalent elements with an atomic weight greater than aluminum are preferred because they are less like to diffuse from the glass. Accordingly, the synthetic silica starting material preferably has a low level of alkali and silicon impurity as demonstrated by the Examples that follow. In fact, the silica is preferably substantially free of silicon, e.g. less than 25 ppm.

A synthetic silica accomplishing these goals can be obtained from the Mitsubishi Kasei Corp., as MKC synthetic silica. Those of ordinary skill in the art will be aware of additional sources of acceptable synthetic silica. A variety of synthetic silica and high purity quartz is available which makes an appropriate starting material from which to form the subject glass composition. However, fused quartz such as purified GE 244, and fused silica such as GE 021, GE 098, and GE 095 available from the General Electric Company Quartz Department, are particularly suited for forming the glass of this invention.

In a further preferred form of the invention, an alternative trivalent element to aluminum will be used, because larger trivalent elements will diffuse through the silica even more slowly than aluminum yet provide the blocks to monovalent ion diffusion and increased viscosity, in combination with yttrium or cesium.

Without being bound by theory, it is believed that alkali metals present in glass act as a migration site by which a sodium ion in the lamp fill can diffuse through the quartz or synthetic silica chamber walls. Since this diffusion from the high energy, high temperature inner wall to the exterior wall of the arc chamber destroys lamp function, it is desirable to minimize these channels and to block sodium ion migration paths. It has been found that the trivalent elements function to block and/or substantially slow the sodium ion diffusion. Moreover, sodium ions are either not attracted to these sites or once present are bound tightly to slow or stop migration.

It has also been discovered that the addition of another oxide, e.g. aluminum, or preferably another larger trivalent element can improve workability in the cesium and/or yttrium doped glass to avoid undesirable devitrification. Particularly, it is believed $3^+$ ions can be added to the Si lattice of Cs or Y doped glass to raise the viscosity and prevent devitrification. Particular examples of these ions preferably include La, Dy, Nb, and Er which typically added in the form of oxides.

In a further preferred embodiment, it is believed that maintaining a low level of sodium ion concentration in the fused quartz or synthetic silica, preferably less than 0.1 ppm sodium, can minimize the diffusion channels.

In addition, for lamp applications, color and other functional properties are optimized when the quartz or silica contains only trace amounts (i.e. less than 2 ppm) of arsenic, boron, calcium, cadmium, copper, magnesium, manganese, nickel, phosphorous, antimony, zirconium, and any other common impurity generally obtained through processing conditions. Moreover, large quantities of these metals are preferably avoided to minimize their undesirable effect on lamp operation.

Preferably, the fused quartz or fused silica is doped with at least about 20 ppm by weight trivalent element in combination with 0 to about 500 ppm by weight yttrium and 0 to about 500 ppm by weight cesium, provided that at least one of yttrium and cesium are present.

In a further preferred embodiment, the glass is comprised of between about 20 and about 500 ppm by weight trivalent element, and between about 20 and about 500 ppm by weight yttrium. More preferably the glass is comprised of between about 20 and about 100 ppm by weight trivalent element, and between about 50 and about 500 ppm by weight yttrium.

In an alternative preferred embodiment, the glass is comprised of between about 20 and about 500 ppm by weight trivalent element and between about 20 and about 1000 ppm by weight cesium. More preferably, the glass is comprised of between about 20 and about 200 ppm by weight trivalent element, and between about 20 and about 500 ppm by weight cesium.

When aluminum or other trivalent element and yttrium are used as dopants, a preferred embodiment of the invention can be described as a glass comprised of quartz or synthetic silica doped with yttrium and trivalent element, wherein the yttrium to trivalent element ratio is between about 1 to 10 and about 10 to 1, and preferably between about 1 to 10 and about 1 to 1. When both the trivalent element and cesium are used as dopants, the glass is preferably comprised of quartz or synthetic silica having a trivalent element to cesium ratio between about 1 to 5 and about 1 to 1. More preferably, the ratio of trivalent element to cesium is between about 1 to 2 about 1 to 1.

As will be inferred from the above description of the invention, the dopants and the quantity in which they are present is selected to reduce the opportunity for sodium to diffuse through the glass. As is recognized by those skilled in the art, volume resistivity is an accepted means of evaluating the tendency of a glass to allow sodium diffusion. Preferably, the inventive glass composition has a volume resistivity of at least about $3.16 \times 10^{10}$ ohm/cm. (eq. log volume resistivity of 10.50). Accordingly, a preferred glass composition is comprised predominantly of $SiO_2$ doped with aluminum or a trivalent element larger than aluminum or a combination of a trivalent elements and at least one of yttrium and cesium to provide a volume resistivity of at least about $3.16 \times 10^{10}$ ohm/cm (log volume resistivity of 10.50) at 300° C., and more preferably at least about $3.16 \times 10^{11}$ ohm/cm (log volume resistivity of 11.5) at 300° C.

Figure 3:
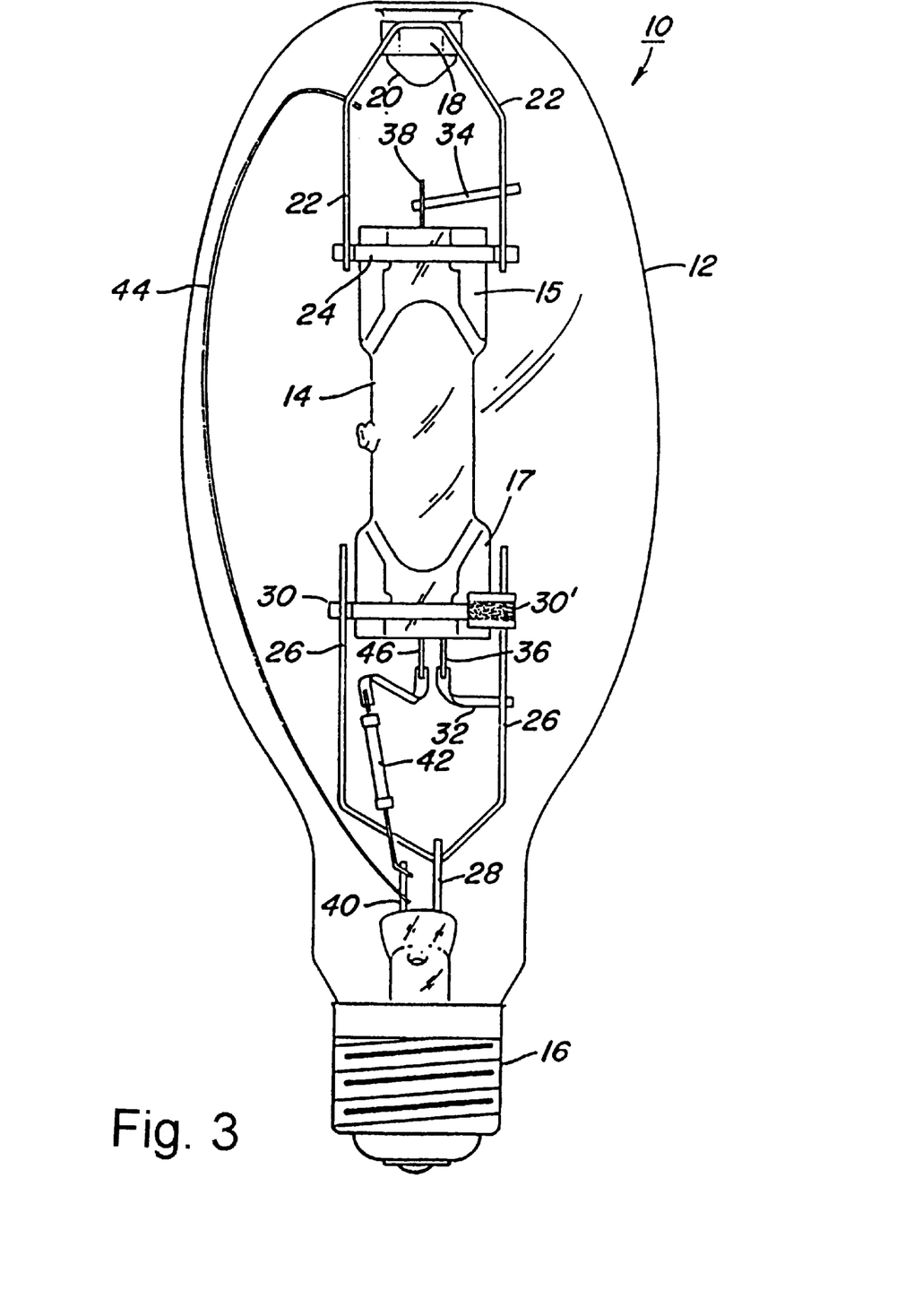
FIG. 3 is a schematic representation of a metal halide lamp.

Referring now to FIG. 3, it may be seen that lamp 10 is comprised of an outer envelope 12 made of a light-transmissive vitreous material and a light-transmissive arc chamber 14 made of fused silica or fused quartz doped with aluminum, yttrium, and/or cesium in accord with the present invention. Lamp 10 further comprises a base 16 having electrical contacts as recognized by those skilled in the art for making electrical connection to the electrodes in arc chamber 14. Although the lamp shown in FIG. 1 is an electroded lamp, the inventive glass composition is equally suitable to form the arc chamber of an electrodeless lamp.

In fact, it is envisioned that the glass composition of the present invention is suitable for any application in which sodium diffusion or electrical resistivity is a problem, for example the manufacture of any type of lamp envelope, semiconductor tubing, or semiconductor crucibles.

In the embodiment shown, the arc chamber 14 is held in place within envelope 12 by frame parts comprising a spring clip metal band 18 surrounded by a dimple 20 and envelope 12. Support 22 is spot welded to band 18 and also spot welded to strap member 24. Strap member 24 is securely and mechanically fastened about the pinched seal regions 15 and 17 of arc chamber 14. The other end of the arc chamber is secured by support member 26 which is spot welded at one end to electrically conductive terminal 28 and welded at the other end to strap member 30. Strap member 30 is securely and mechanically fastened about the second pinched seal region 17 of the arc chamber 14. Conductive members 32 and 34 are spot welded at one end to support members 26 and 22, respectively, at the other end to inleads 36 and 38, respectively, of the respective arc chamber 14 electrodes (not shown). Electrically conductive member 40 is spot welded to resistor 42 and current conductor 44. The other end of resistor 42 is connected to the inlead 46 of a starting electrode (not shown). Except for conductor 44 and inleads 36, 38, and 46 which are made of molybdenum, the actual resistor portion of resistor 42, all of the frame parts may be made of a nickel plated steel. The lamp also contains a getter strip 30' coated with a metal alloy material primarily to get or absorb hydrogen from the lamp envelope.

In the present preferred embodiment of the invention, the arc discharge chamber 14 is constructed of the inventive glass.

To further exemplify the invention, but not to limit the scope, the following examples demonstrate advantageous properties of the inventive glass composition.

Examples

Each of samples 1–7 were prepared from Mitsubishi MKC synthetic silica. Samples 1 and 2 demonstrate the composition of the silica. Examples 3–7 demonstrate fused synthetic silica following addition of various parts per million of alumina. The alumina was obtained from Reynolds Aluminum, particularly RC-HPT-DBM. The alumina was well mixed with the silica and thereafter calcined at about 1050° C. to remove residual organics. The resultant powder was analyzed and the results are shown in Table 1.

Preferably, the powder obtained is thereafter formed into a clear article as described in U.S. Pat. Nos. 3,261,676 and 3,764,286, herein incorporated by reference. The term "clear" as utilized herein means that the fused glass composition is substantially free of trapped gas bubbles.

TABLE 1

| | Samples 1–7 | | | | | | |
|---|---|---|---|---|---|---|---|
| | 1 | 2 | 3 | 4 | 5 | 6 | 7 |
| Chemical (ppm) | | | | | | | |
| Al | 0.3 | 0.2 | 3.0 | 2.7 | 7.3 | 13.7 | 29.9 |
| Ba | <.05 | <.05 | <.05 | <.05 | <.05 | <.05 | <.05 |
| Ca | <.05 | <.05 | <.1 | <.05 | <.05 | <.05 | <.05 |
| Cd | <.02 | <.02 | <.02 | <.02 | <.02 | <.02 | <.02 |
| Co | <.02 | <.02 | <.02 | <.02 | <.02 | <.02 | <.02 |
| Cu | <.03 | <.03 | <.03 | <.03 | <.03 | <.03 | <.03 |
| Fe | 0.1 | 0.08 | 0.1 | 0.09 | 0.07 | 0.07 | 0.08 |
| K | <.05 | <.05 | 0.1 | 0.1 | 0.1 | 0.2 | 0.2 |
| Li | <.05 | <.05 | <.2 | <.05 | <.05 | <.05 | <.05 |
| Mg | <.1 | <.05 | <.1 | <.05 | <.05 | <.05 | <.05 |
| Mn | <.02 | <.02 | <.03 | <.02 | <.02 | <.02 | <.02 |
| Mo | <.02 | <.02 | <.02 | <.02 | <.02 | <.02 | <.02 |
| Na | <.05 | <.05 | <.3 | 0.1 | 0.1 | 0.1 | 0.2 |
| Ni | <.05 | <.05 | <.05 | <.05 | <.05 | <.05 | <.05 |
| P | <.1 | <.1 | <.1 | <.1 | <.1 | <.1 | <.1 |
| Sr | <.03 | <.03 | <.03 | <.03 | <.03 | <.03 | <.03 |
| Ti | <.02 | 0.05 | 0.2 | <.02 | <.02 | 0.1 | 0.04 |
| Zn | <.05 | <.05 | <.05 | <.05 | <.05 | <.05 | <.05 |
| Zr | <.02 | <.02 | 0.2 | <.02 | <.02 | <.02 | 0.04 |
| Log Viscosity | | | | | | | |
| @ 1100 C. | 13.9 | 14.0 | 14.4 | 14.8 | 15.0 | 14.7 | 14.8 |
| @ 1200 C. | 12.7 | 12.7 | 13.0 | 13.3 | 13.5 | 13.3 | 13.3 |
| @ 1300 C. | 11.6 | 11.6 | 11.8 | 12.0 | 12.1 | 12.0 | 12.0 |
| Annealing Point (C.) | 1161.0 | 1163.0 | 1187 | 1208.0 | 1218.9 | 1208.9 | 1207.6 |
| Strain Point (C.) | 1050.0 | 1052.3 | 1085 | 1109.0 | 1121.6 | 1105.0 | 1106.9 |
| Activation Energy (kcal/mol/K) | 117 | 118 | 133 | 142 | 146 | 135 | 139 |

The annealing point is the temperature at which the internal stress is substantially relieved at 15 minutes. The corresponding viscosity is $10^{13.2}$ poise.

The strain point is the temperature at which the internal stress is substantially relieved at 4 hours. The corresponding viscosity is $10^{14.5}$ poise.

Figure 4:
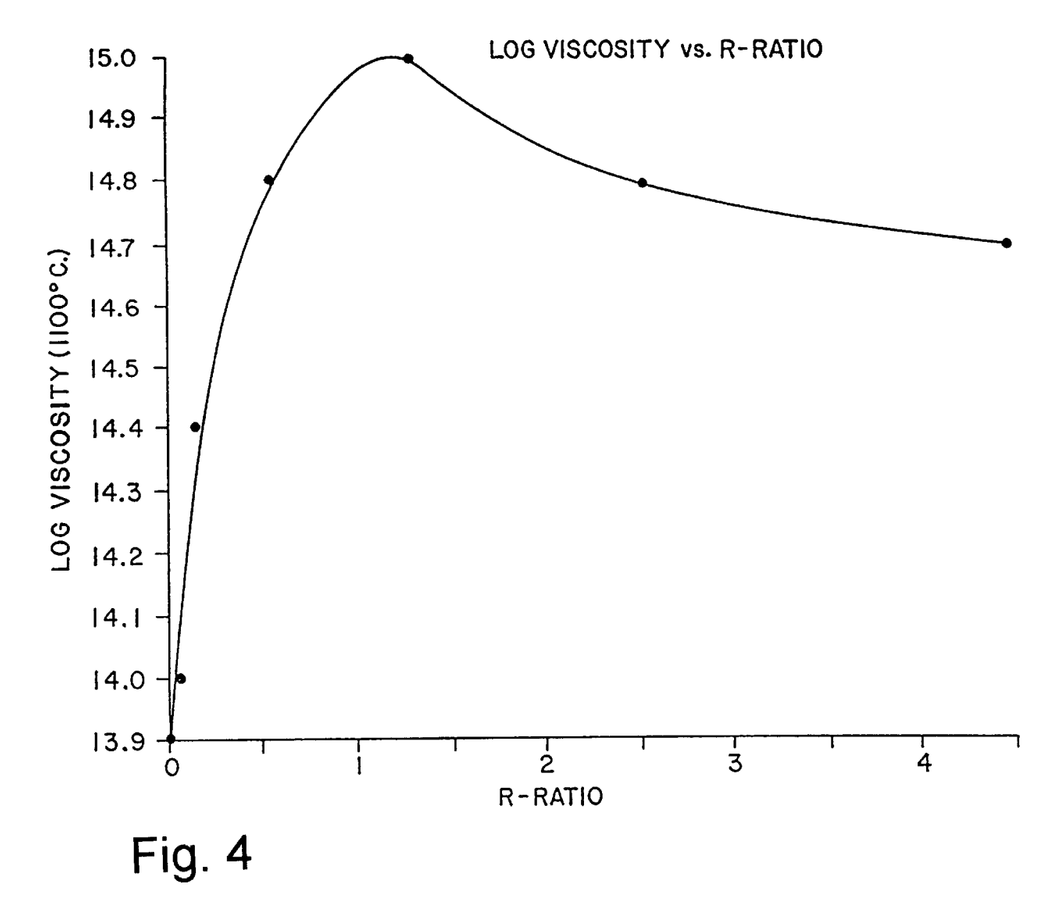
FIG. 4 is a graphical representation of the R-ratio.

Table 1 describes the effect of various aluminum quantities on a synthetic fused silica mixture. FIG. 4 graphically reflects the log viscosity of synthetic fused silica having various aluminum contents at 1100° C. FIG. 4 demonstrates a preferred viscosity for semiconductor applications is achieved by a synthetic fused silica composition having an R ratio of between 0.5 and 4 and preferably between about 1.0 and about 1.25.

As will be apparent to one of ordinary skill in the art, this invention also provides a process for tailoring viscosity to non-semiconductor industries. Accordingly, an understanding of the alkali and hydroxyl levels allows addition of the appropriate alumina content to achieve the desired viscosity.

Comparative Examples

Sample 8 (comparative) was comprised of synthetic silica doped with 500 ppm silicon and 100 ppm aluminum. To prepare Sample 8, 495.85 grams of synthetic silica obtained from Mitsubishi Chemical Corporation were mixed with 2.50 grams of silicon (99.99% purity) obtained from Ethle corporation, 0.95 grams of $Al_2O_3$ (reagent grade) obtained from Baker Chemicals and 0.70 grams of cab-o-sil obtained from Cabot Corp. in a Turbula mixer for 20 minutes to form a blend.

Sample 9 was comprised of synthetic silica doped with 9 ppm aluminum. To prepare Sample 9, 0.85 grams of 1% $Al_2O_3$ in synthetic silica sand obtained from Baker Chemicals and 0.15 grams of cab-o-sil obtained from Cabot Corp. were mixed with 499 grams of synthetic silica obtained from Mitsubishi Chemical Corporation using a Turbula mixer for 20 minutes to form a blend.

Samples 8 and 9 were fused side-by-side in a molybdenum foil boat in a high temperature tungsten furnace at 1800° C. having a hydrogen atmosphere according to the following schedule. The furnace was evacuated to between $10^{-4}$ and $10^{-5}$ torr and back filled with hydrogen. The furnace was taken up to 1800° C. over a 30 minute period and held at that temperature for 60 minutes. Thereafter, the furnace was allowed to cool to room temperature.

The samples were approximately 25 mm×25 mm×20 mm cubes. Visual inspection showed Sample 8 contained at least several hundred trapped gas bubbles. In contrast, Sample 9 contained about twenty or fewer trapped gas bubbles. As is well accepted in the art, the large volume of trapped gas in Sample 8 causes opacity in an elongated body. In fact, tubes formed of the composition of Sample 8 were substantially opaque and unacceptable for a semiconductor application.

Samples 10–12

In preparing the samples, $Al_2O_3$ (from Reynold Aluminum, RC-HPT-DBM grade), $Y_2O_3$ (Rhone-Poulenc, 99.99% phosphor grade) and 20% by weight to total dopant Cabosil (Cabot Corporation, M-5 grade) were blended for 20 minutes in a Turbula mixer to achieve the dopant quantities (parts per million by weight) set forth in Table 1. Particularly, 1.8889, 9.4444 and 17.0000 grams of 1% $Al_2O_3$ in quartz sand and 11.5349, 6.6481 and 1.3776 grams of 1% $Y_2O_3$ in quartz sand were used in samples 1, 2, and 3, respectively, to achieve a dopant mixture.

Figure 5:
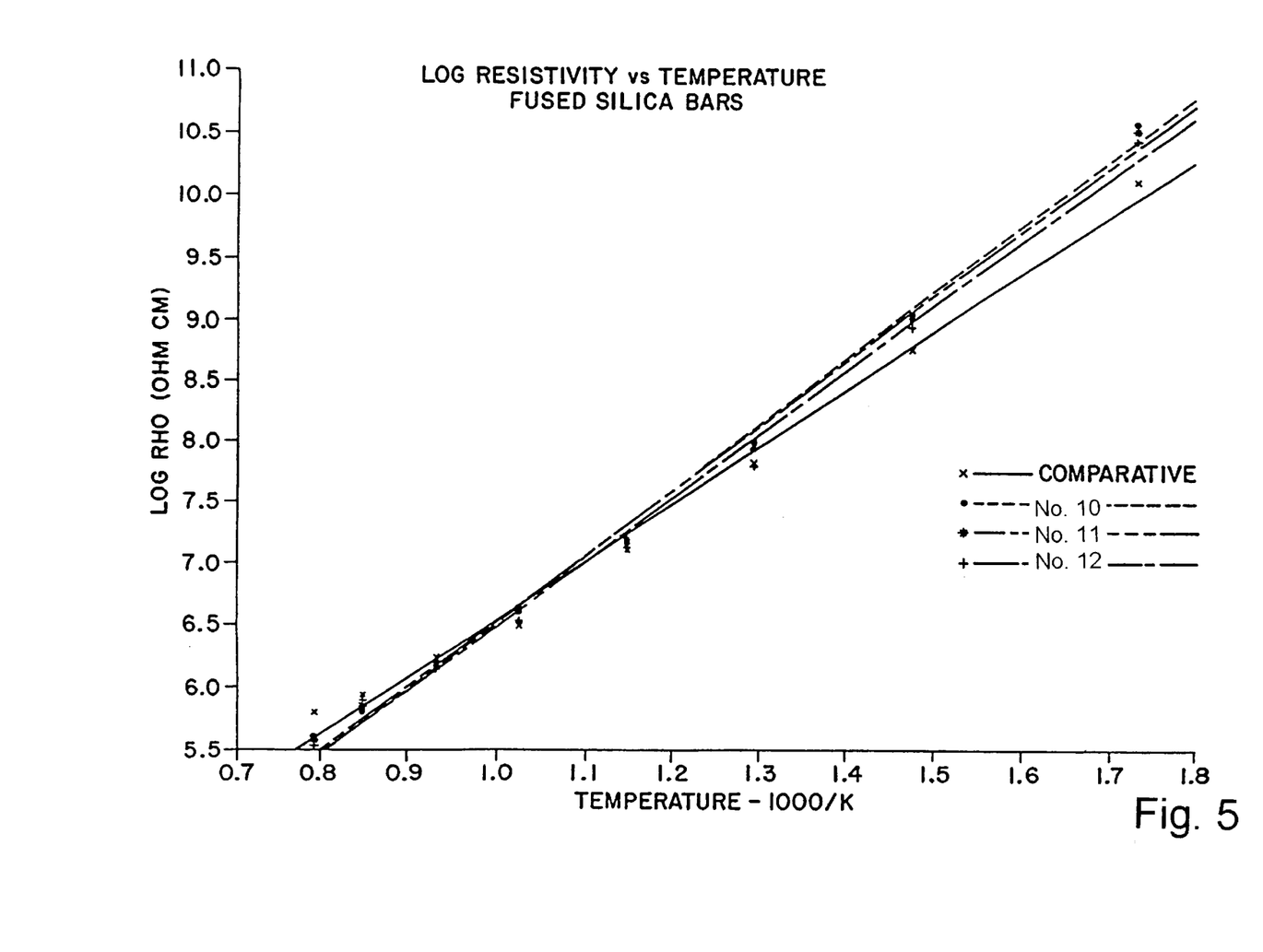
FIG. 5 is a graphical representation of the log volume resistivity of various fused quartz compositions doped with aluminum and yttrium in accord with the present invention and examples; and, FIG. 6 is a graphical representation of the log volume resistivity of various fused quartz compositions doped with cesium and co-doped with aluminum and cesium in accord with the present invention and examples.

The blended dopant mixture was made up to 200 g using GE A-07 quartz sand in a 500 ml plastic bottle. The bottle was then tumbled in a Turbula mixer for 20 minutes. The blended compositions were then fused at 1800° C. for 1 hour in rectangular molybdenum boats in a Brew furnace under a hydrogen atmosphere. Each sample was sliced and polished for electrical conductivity measurements according to procedure ASTM 257. The results of the volume resistivity testing in Log ohm-cm at various temperatures is displayed in Table 2 (also see FIG. 5).

TABLE 2

| Temperature (° C.) | Undoped Quartz Log ohm-cm | Sample 10 Al 50 | Sample 10 Y 450 | Sample 11 Al 250 | Sample 11 Y 250 | Sample 12 Al 450 | Sample 12 Y 50 |
|---|---|---|---|---|---|---|---|
| 304 | 10.12 | 10.59 | | 10.51 | | 10.46 | |
| 405 | 8.76 | 9.04 | | 9.00 | | 8.97 | |
| 505 | 7.81 | 7.97 | | 7.96 | | 7.82 | |
| 606 | 7.11 | 7.17 | | 7.18 | | 7.14 | |
| 706 | 6.52 | 6.60 | | 6.63 | | 6.57 | |
| 804 | 6.20 | 6.16 | | 6.17 | | 6.15 | |
| 903 | 5.92 | 5.81 | | 5.81 | | 5.81 | |
| 1000 | 5.77 | 5.55 | | 5.53 | | 5.54 | |

As is apparent, the samples doped with aluminum and yttrium demonstrated a significantly higher volume resistivity in the important temperature ranges than the undoped comparative example. As recognized by those skilled in the art, this evidences an increased resistance in sodium diffusion.

Example 13–15

High purity fused quartz samples were doped with cesium and two different concentrations of combined cesium and aluminum and evaluated for volume resistivity relative to a comparative example of un-doped fused quartz. 0, 3.8000 and 3.8000 grams of 1% $Al_2O_3$ in quartz sand and 1.4662, 2.9877, and 5.9201 grams of 1% $CsNO_3$ (ALFA Chemicals) in quartz sand and 20% by weight to total dopant Cabosil (Cabot Corporation, M-5 grade), respectively, were blended for 20 minutes in a Turbula mixer to yield a dopant mixture comprised of the quantities (in parts per million) set forth in Table 3.

Figure 6:
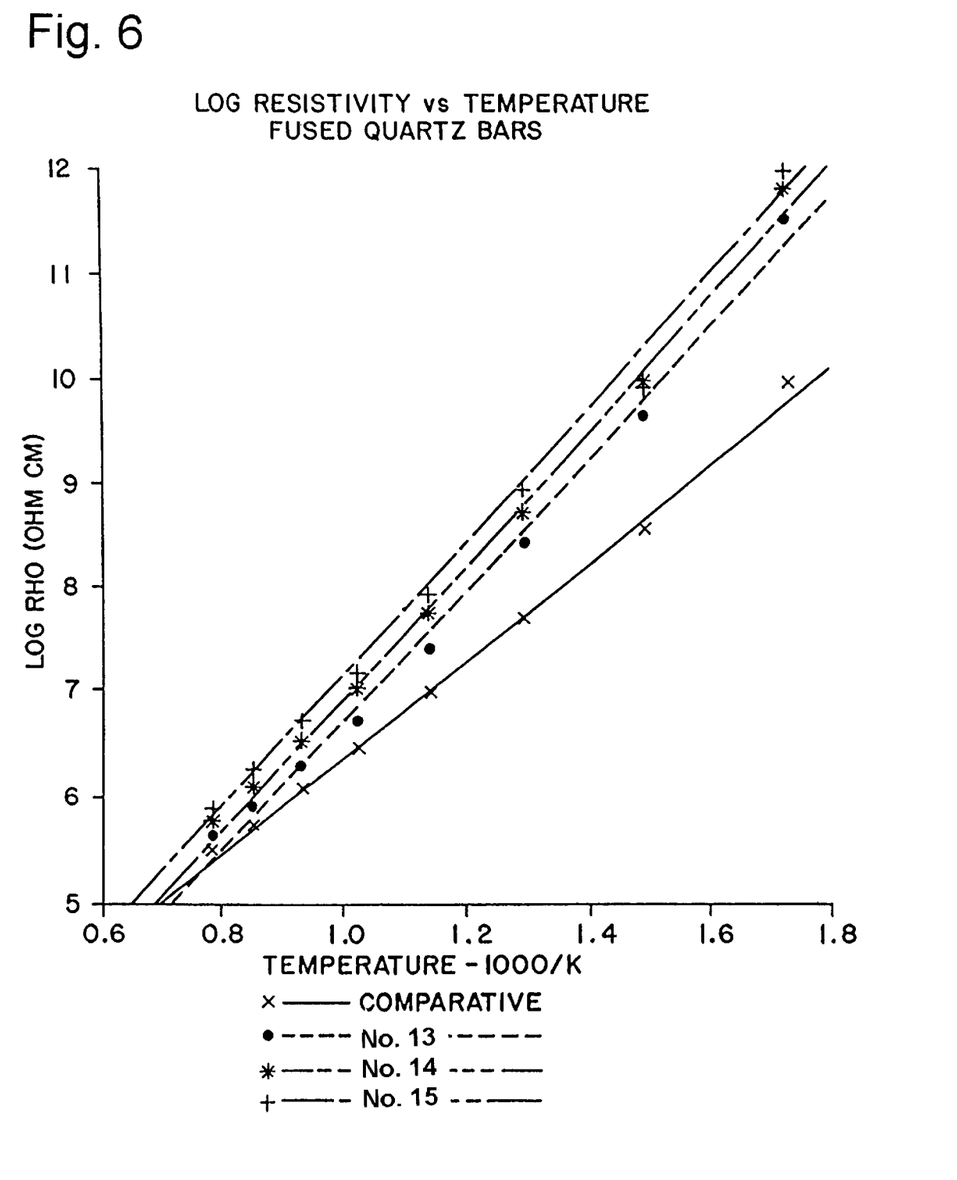

The blended dopant mixture was made up to 200 g using GE A-07 quartz sand in a 500 ml plastic bottle and tumbled for 20 minutes in a Turbula mixer. The blended compositions were then fused at 1800° C. for 1 hour in rectangular molybdenum boats in a Brew furnace under a hydrogen atmosphere. Each sample was sliced and polished for electrical conductivity measurements according to ASTM 257. The results of the volume resistivity testing in Ohm-cm at various temperatures is displayed in Table 3 (also see FIG. 6).

TABLE 3

| Temperature (° C.) | Undoped Quartz Log ohm-cm | Sample 13 Cs 50 | Sample 14 Cs 100 | Sample 14 Al 100 | Sample 15 Cs 200 | Sample 15 Al 100 |
|---|---|---|---|---|---|---|
| 304 | 9.94 | 11.48 | 11.71 | | 11.96 | |
| 400 | 8.51 | 9.63 | 9.93 | | 9.94 | |
| 505 | 7.66 | 8.39 | 8.66 | | 8.96 | |
| 604 | 6.97 | 7.37 | 7.68 | | 7.95 | |
| 703 | 6.44 | 6.68 | 6.96 | | 7.19 | |
| 802 | 6.05 | 6.25 | 6.45 | | 6.73 | |
| 901 | 5.72 | 5.90 | 6.05 | | 6.28 | |
| 1001 | 5.48 | 5.62 | 5.73 | | 5.91 | |

As is apparent, the samples doped with cesium or a mixture of aluminum and cesium demonstrated a significantly higher volume resistivity than the comparative sample. As recognized by one skilled in the art, these results evidence an increased resistance in sodium diffusion in the inventive glass composition.

Lamp Testing

Tubing (3 mm (OD)×5 mm (ID)) was formed from GE 021 quartz as a control and two doped cells were fabricated with dopant mixtures prepared according to the above procedures. Each set of tubing was constructed using production quartz furnaces at the GE Willoughby Quartz Plant, Willoughby, Ohio. Cell A (control) was made from GE 021 quartz, Cell B was made from GE 021 quartz doped with 50 wppm Al and 200 wppm Cs. Cell C was made from GE 021 quartz doped with 50 wppm Al and 450 wppm Y. The control and doped quartz tubing were then processed into 70 watt MXR metal halide lamps using the General Electric metal halide manufacturing processes at Ravenna Lamp Plant in Ravenna, Ohio.

Lamps were burned for 1000 hrs. to evaluate differences in performance between the quartz cells. Results are summarized in Table 4. Delta voltage refers to the change in voltage between 100 hrs. of lamp burning and 1000 hrs. The maintenance refers to the light levels at 1000 hrs., where the light levels were established as 100% at 100 hrs. Results are the average for test cell sizes of 10–12 lamps.

TABLE 4

MXR70 Watt Metal Halide Lamps Using Doped Quartz

| Cell | Quartz Type | Delta Voltage (1000 hrs.) | Lamp Maintenance (1000 hrs.) |
|---|---|---|---|
| A | GE 021 Control | +2.8 v | 85.3% |
| B | GE 021 (50 Al, 200 Cs) | +0.7 v | 87.5% |
| C | GE 021 (50 Al, 450 Y) | +0.7 v | 91.4% |

The results show both doped cells (B, C) exhibit less voltage rise and improved lumen maintenance over the control which is indicative of less sodium loss during lamp operation.

Thus, it is apparent that there has been provided, in accordance with the invention, an arc chamber for a sodium containing lamp that fully satisfies the objects, aims, and advantages set forth above. While the invention has been described in conjunction with the specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed is:

1. A metal halide or mercury lamp including an arc tube comprised of a glass composition consisting essentially of at least 90 weight percent $SiO_2$ and including between about 10 and 1000 parts per million of a trivalent element selected from the group consisting of Pr, Nd, Pm, Sm, Gd, Tb, Dy, Ho, Er, Tm, Yb, Lu, Ac, Th, Pa, U, Np, Pu, Am, Cm, Bk, Cf, Es, Fm, Md, No, Lr, Unq, Unp, Ga, and a mixtures thereof such that the viscosity of the glass composition is greater than $10^{14.5}$ poise at a 1100° C.

2. A metal halide or mercury lamp including an arc tube comprised of a glass composition according to claim 1 wherein said trivalent element is present generally in the form of an oxide.

3. A metal halide or mercury lamp including an arc tube comprised of a glass composition according to claim 1 as used in the construction of a metal halide lamp.

4. A rod, tube or crucible comprised of a glass composition consisting essentially of at least 90 percent by weight $SiO_2$ and including between 10 and 1000 parts per million of a trivalent element selected from the group consisting of Pr, Nd, Pm, Sm, Gd, Tb, Dy, Ho, Er, Tm, Yb, Lu, Ac, Th, Pa, U, Np, Pu, Am, Cm, Bk, Cf, Es, Fm, Md, No, Lr, Unq, Unp, Ga, and a mixture thereof.

5. A rod, tube or crucible comprised of a glass composition according to claim 4 wherein at least two said trivalent elements are present in said $SiO_2$.

6. A rod, tube or crucible comprised of a glass composition according to claim 4, including between 10 and 1000 parts per million trivalent element.

7. A rod, tube or crucible comprised of a glass composition according to claim 4 wherein said trivalent element is present in the form of an oxide.

8. A rod, tube or crucible comprised of a glass composition according to claim 4 wherein with the exception of said trivalent elements, less than 20 ppm impurities are found in said $SiO_2$.

9. A rod, tube or crucible comprised of a glass composition according to claim 8 wherein less than 0.1 parts per million sodium, less than 0.1 parts per million potassium and lithium, less than 0.2 parts per million iron, less than 0.5 parts per million chromium and less than 25 parts per million silicon are present in said $SiO_2$.

10. A rod, tube or crucible comprised of a glass composition according to claim 4 wherein yttrium is involved in said $SiO_2$ with a second trivalent element.

11. A rod, tube or crucible comprised of a glass composition according to claim 4 wherein cesium is included with a second trivalent element in said $SiO_2$.

12. A rod, tube or crucible comprised of a glass composition according to claim 10 wherein the ratio of said yttrium to said other trivalent element is between 1 and 10.

13. A rod, tube or crucible comprised of a glass composition according to claim 11 wherein said ratio of cesium to said other trivalent element is between 1 and 5.

* * * * *